United States Patent
Choi et al.

(10) Patent No.: US 12,128,801 B2
(45) Date of Patent: Oct. 29, 2024

(54) HOT MELT TAPE FOR VELCRO WITHOUT SEWING AND METHOD FOR MANUFACTURING SEAT PADDING MATERIAL FOR VEHICLES USING THE SAME

(71) Applicants: HYUNDAI TRANSYS INCORPORATED, Seosan-si (KR); MUJIN CO., LTD., Yangsan-si (KR)

(72) Inventors: Hye Rin Choi, Hwaseong-si (KR); Jun Ho Song, Hwaseong-si (KR); Jae Hong Woo, Yangsan-si (KR); Seung Keon Woo, Yangsan-si (KR)

(73) Assignees: HYUNDAI TRANSYS INCORPORATED, Seosan-si (KR); MUJIN CO., LTD., Yangsan-si (KR)

( * ) Notice: Subject to any disclaimer, the term of this patent is extended or adjusted under 35 U.S.C. 154(b) by 114 days.

(21) Appl. No.: 18/186,770

(22) Filed: Mar. 20, 2023

(65) Prior Publication Data
US 2023/0220245 A1 Jul. 13, 2023

Related U.S. Application Data

(62) Division of application No. 16/951,284, filed on Nov. 18, 2020, now abandoned.

(30) Foreign Application Priority Data

Nov. 21, 2019 (KR) .................. 10-2019-0150769

(51) Int. Cl.
*B60N 2/58* (2006.01)
*A44B 18/00* (2006.01)
(Continued)

(52) U.S. Cl.
CPC ........ *B60N 2/5891* (2013.01); *A44B 18/0073* (2013.01); *B32B 5/022* (2013.01);
(Continued)

(58) Field of Classification Search
CPC .. B60N 2/5833; B60N 2/5875; B60N 2/5891; B60N 2/6036; B60N 2/6081;
(Continued)

(56) References Cited

U.S. PATENT DOCUMENTS 8,592,530 B2 * 11/2013 Chang .................. C08G 63/916
525/410
2010/0040889 A1 * 2/2010 Harano .................... A43B 9/12
156/275.7

(Continued)

FOREIGN PATENT DOCUMENTS

| CN | 103045111 A | 4/2013 |
| CN | 103767196 A | 5/2014 |

(Continued)

OTHER PUBLICATIONS

Stephan Knappe, "Influences of Heating and Cooling Rates on the DSC Measurement Result", Netzsch: Application Note, 1-2, 2013, Retrieved from https://analyzing-testing.netzsch.com/_Resources/Persistent/8/4/e/a/84eab21b2d605 ce99da1b9fe95e7598c1ae43069/AN%20035_Influences%20of%20Heating%20and%20Cooling%20Rates%20on%20the%20DSC%20Measurement%20Result.pdf.
(Continued)

*Primary Examiner* — John L Goff, II
(74) *Attorney, Agent, or Firm* — Bridgeway IP Law Group, PLLC; Jihun Kim

(57) ABSTRACT

Disclosed are a hot melt tape for hook-and-loop fasteners without sewing which may be adhered at a low temperature and complete hardening of an adhesive resin in a short time and a method for manufacturing a seat padding material for (Continued)

vehicles using the same. The method includes preparing the padding material and a hook-and-loop fabric, preparing a hot melt tape having a hot melt resin layer by coating a surface of a release paper with a reactive hot melt resin having a melting point of 40-80° C. before reacting, adhering the hot melt tape to a surface of the padding material by applying heat of a temperature of 30-70° C. and pressure thereto, removing the release paper, adhering the hook-and-loop fabric to the exposed hot melt resin layer, and hardening the hot melt resin layer by cooling the padding material and the hook-and-loop fabric to a temperature of 0-20° C.

4 Claims, 1 Drawing Sheet

(51) Int. Cl.
| | | |
|---|---|---|
| *B32B 5/02* | (2006.01) | |
| *B32B 5/18* | (2006.01) | |
| *B32B 5/24* | (2006.01) | |
| *B32B 5/26* | (2006.01) | |
| *B32B 37/06* | (2006.01) | |
| *B32B 37/08* | (2006.01) | |
| *B32B 37/10* | (2006.01) | |
| *B32B 37/12* | (2006.01) | |
| *B60N 2/70* | (2006.01) | |
| *B60N 2/72* | (2006.01) | |
| *C09J 5/06* | (2006.01) | |
| *C09J 7/10* | (2018.01) | |
| *C09J 7/30* | (2018.01) | |
| *C09J 7/35* | (2018.01) | |
| *C08K 3/34* | (2006.01) | |

(52) U.S. Cl.
CPC ............... *B32B 5/18* (2013.01); *B32B 5/245* (2013.01); *B32B 5/265* (2021.05); *B32B 37/06* (2013.01); *B32B 37/08* (2013.01); *B32B 37/10* (2013.01); *B32B 37/1207* (2013.01); *B60N 2/5833* (2013.01); *B60N 2/5875* (2013.01); *B60N 2/7017* (2013.01); *B60N 2/72* (2013.01); *C09J 5/06* (2013.01); *C09J 7/10* (2018.01); *C09J 7/30* (2018.01); *C09J 7/35* (2018.01); *A44B 18/00* (2013.01); *B32B 2037/1215* (2013.01); *B32B 2250/02* (2013.01); *B32B 2255/26* (2013.01); *B32B 2262/0284* (2013.01); *B32B 2305/18* (2013.01); *B32B 2307/748* (2013.01); *B32B 2309/02* (2013.01); *B32B 2605/003* (2013.01); *B32B 2605/08* (2013.01); *C08K 3/346* (2013.01); *C09J 2203/358* (2020.08); *C09J 2301/408* (2020.08); *C09J 2400/10* (2013.01); *C09J 2467/00* (2013.01); *C09J 2475/00* (2013.01)

(58) Field of Classification Search
CPC ........ B60N 2/7017; B60N 2/72; A44B 18/00; A44B 18/0073; C09J 7/10; C09J 7/30; C09J 7/35; C09J 5/06; C09J 2203/358; C09J 2301/408; C09J 2400/10; C09J 2467/00; C09J 2475/00; B32B 5/265; B32B 2037/1215; B32B 2262/0284; C08K 3/346
USPC ......................................................... 156/66
See application file for complete search history.

(56) References Cited

U.S. PATENT DOCUMENTS

| | | | | |
|---|---|---|---|---|
| 2010/0181817 A1* | 7/2010 | Tanaka | ................... | D04B 21/16 24/442 |
| 2022/0218074 A1* | 7/2022 | Ono | .................... | B60R 13/0212 |

FOREIGN PATENT DOCUMENTS

| | | | |
|---|---|---|---|
| CN | 104302199 | A | 1/2015 |
| CN | 10-7353839 | A | 11/2017 |
| EP | 13507522 | B1 | 3/2006 |
| JP | 09123331 | A * | 5/1997 |
| JP | 2006-193719 | A | 7/2006 |
| JP | 2019-508529 | A | 3/2019 |
| KR | 10-0475044 | B1 | 3/2005 |
| KR | 10-2008-0015189 | A | 2/2008 |
| KR | 10-0842218 | B1 | 6/2008 |
| KR | 10-2008-0062199 | A | 7/2008 |
| KR | 10-2010-0117181 | A | 11/2010 |
| KR | 10-2011-0114608 | A | 10/2011 |
| KR | 10-2015-0013714 | A | 2/2015 |
| KR | 101709909 | B1 | 2/2017 |
| KR | 10-1855924 | B1 | 5/2018 |
| KR | 10-2018-0103292 | A | 9/2018 |
| KR | 10-2019-0027418 | A | 3/2019 |
| KR | 10-2019-0063243 | A | 6/2019 |
| KR | 10-2019-0121966 | A | 10/2019 |
| WO | 2010/080967 | A1 | 7/2010 |
| WO | 2013/167250 | A1 | 11/2013 |
| WO | 2017/121540 | A1 | 7/2017 |

OTHER PUBLICATIONS

M. Alevizopoulou, "Office Action for EP Application No. 20 204 091.1", Aug. 4, 2023, EPO, Munich, Germany.

* cited by examiner

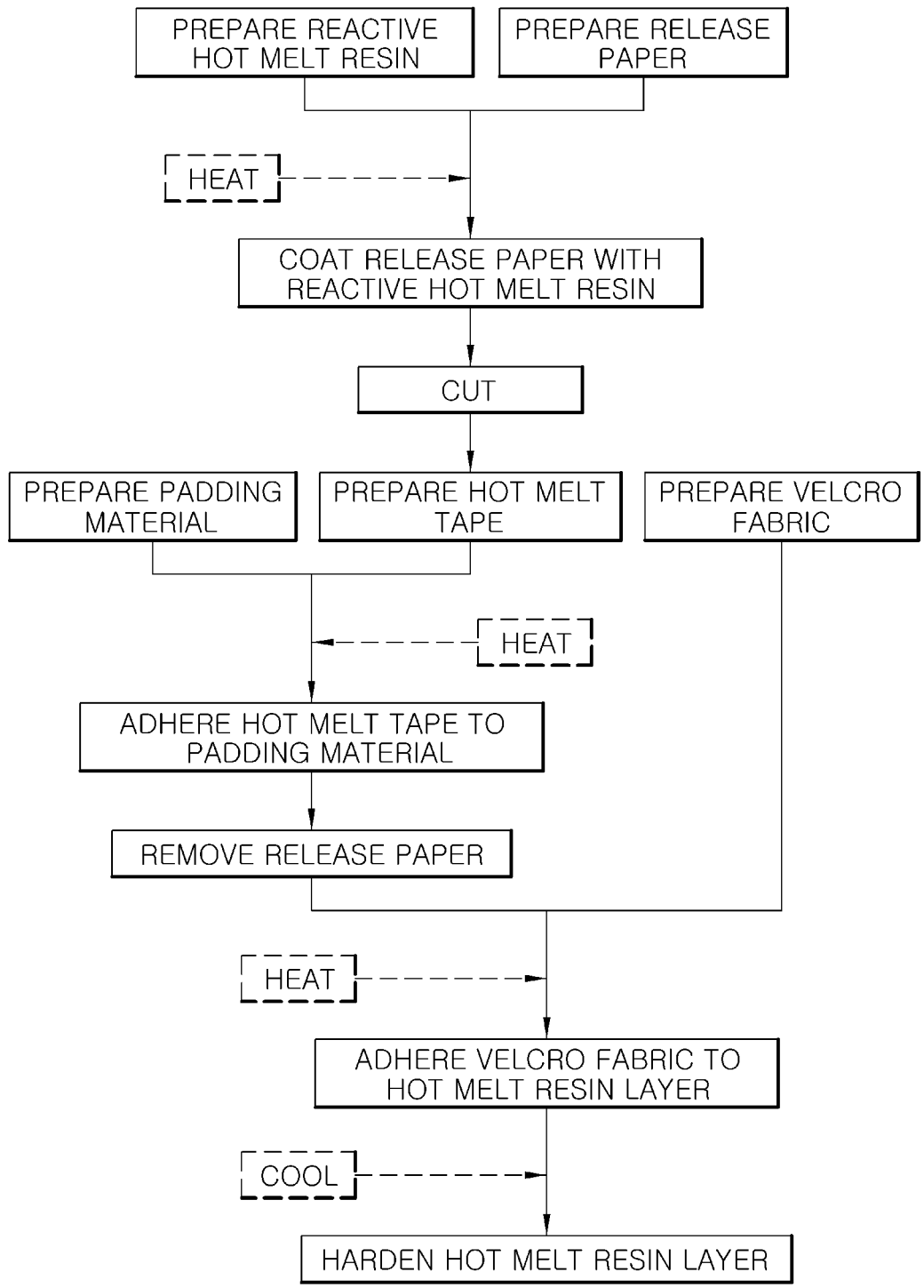

HOT MELT TAPE FOR VELCRO WITHOUT SEWING AND METHOD FOR MANUFACTURING SEAT PADDING MATERIAL FOR VEHICLES USING THE SAME

CROSS-REFERENCE TO RELATED APPLICATION

This application is a divisional application of U.S. application Ser. No. 16/951,284 filed on Nov. 18, 2020, which claims priority from Korean Patent Application No. 10-2019-0150769, filed on Nov. 21, 2019, in the Korean Intellectual Property Office, the disclosure of which is incorporated herein by reference in its entirety.

BACKGROUND OF THE INVENTION

1. Field of the Invention

The present invention relates to a hot melt tape for Velcro® (hook-and-loop fasteners) without sewing and a method for manufacturing a seat padding material for vehicles using the same, and more particularly to a hot melt tape for Velcro® without sewing which may be adhered at a low temperature and complete hardening of an adhesive resin in a short time and a method for manufacturing a seat padding material for vehicles using the same.

2. Description of the Related Art

In general, various interior materials are used in vehicles.

Seats applied to vehicles are a representative interior material, and a seat is manufactured by adhering a cover material formed of natural leather or artificial leather to a cushion material in the form of a sponge or a non-woven fabric having cushioning and buffering functions. Here, Velcro® fabrics are mainly used to adhere the cover material to the cushion material.

In order to adhere the cover material to the cushion material using the Velcro® fabrics, the Velcro® fabrics must be adhered to the cushion material and the cover material, and here, a method for adhering the Velcro® fabrics to the cushion material and the cover material through sewing and a method for adhering the Velcro® fabrics to the cushion material and the cover material using a double-sided tape are generally used.

However, if the method for adhering the Velcro® fabrics to the cushion material and the cover material through sewing is used, sewing lines protrude from the outer surface of the cushion material or the cover material, and if the method for adhering the Velcro® fabrics to the cushion material using the double-sided tape is used, the double-sided tape has weaker adhesion strength than adhesive power between the Velcro® fabrics and thus the Velcro® fabrics may be peeled off from the cushion material or the cover material.

In order to overcome the above-described drawbacks, a method for adhering Velcro® fabrics to the cover material and the cushion material using a hot melt film, which is hardened at a high temperature, has recently been used, but in this case, loop yarns, which are formed of polyester or the like so as to form the hot melt film, are damaged by heat of a high temperature and pressure and may thus not function appropriately.

Further, if a low melting point EVA hot melt or PSA hot melt adhesive configured to be adhered to an object at a low temperature is adhered to the cushion material or the cover material at a temperature of 60° C. or lower, and damage to loop yarns thereof is prevented, but a required peel strength value is not satisfied. Further, when heat is again applied to the low melting point EVA hot melt or PSA hot melt adhesive, the adhesive peels off from the cushion material or the cover material due to the low heat resistance thereof.

In addition, if an organic solvent-type adhesive is used, the interface between the cushion material or the cover material or the Velcro® fabric is not in an isolation state, the adhesive permeates one of the cushion or cover material or the Velcro® fabric and may thus not exhibit the adhesive performance thereof.

The above description has been provided to aid in understanding of the background of the present invention and should not be interpreted as conventional technology known to those skilled in the art.

SUMMARY OF THE INVENTION

Therefore, the present invention has been made in view of the above problems, and it is an object of the present invention to provide a hot melt tape for Velcro® without sewing which may be adhered at a low temperature and complete hardening of an adhesive resin in a short time and a method for manufacturing a seat padding material for vehicles using the same.

In accordance with an aspect of the present invention, the above and other objects can be accomplished by the provision of a hot melt tape for Velcro® without sewing used to adhere a Velcro® fabric to a padding material forming a seat for vehicles, including a release paper, and a hot melt resin layer formed by coating a surface of the release paper with a reactive hot melt resin having a melting point of 40-80° C. before reacting.

The reactive hot melt resin may include a base resin, and the base resin may include polyol acquired by reacting polycaprolactone (PCL) having a melting point of 50-70° C. and polyester polyol with each other.

The reactive hot melt resin may include 0.5-2 wt % of montmorillonite (MMT) and a balance of the base resin.

In accordance with another aspect of the present invention, there is provided a method for manufacturing a seat padding material for vehicles, including preparing a padding material forming a seat for vehicles and a Velcro® fabric, preparing a hot melt tape having a hot melt resin layer formed by coating a surface of a release paper with a reactive hot melt resin having a melting point of 40-80° C. before reacting, adhering the hot melt tape to a surface of the prepared padding material by disposing the hot melt tape on the padding material and then applying heat of a temperature of 30-70° C. and pressure thereto, removing the release paper from the hot melt tape adhered to the padding material, adhering the Velcro® fabric to the hot melt resin layer exposed by removing the release paper, and hardening the hot melt resin layer by cooling the padding material and the Velcro® fabric, adhered to each other by the hot melt resin layer, to a temperature of 0-20° C.

In the preparing the hot melt tape, the reactive hot melt resin may include a base resin, and the base resin may include polyol acquired by reacting polycaprolactone (PCL) having a melting point of 50-70° C. and polyester polyol with each other.

In the preparing the hot melt tape, the reactive hot melt resin may include 0.5-2 wt % of montmorillonite (MMT) and a balance of the base resin.

After the hardening the hot melt resin layer, peel strength of the padding material and the Velcro® fabric may be 5 N/mm or higher.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a flowchart illustrating a method for manufacturing a seat padding material for vehicles according to one embodiment of the present invention.

DETAILED DESCRIPTION OF THE PREFERRED EMBODIMENTS

Reference will now be made in detail to the preferred embodiments of the present invention, examples of which are illustrated in the accompanying drawings. However, the present invention is not limited to the aspects disclosed herein but may be implemented in various different forms. These embodiments are provided to make the description of the present disclosure thorough and to fully convey the scope of the present invention to those skilled in the art.

First, a hot melt tape for Velcro® without sewing according to one embodiment of the present invention serves to respectively adhere Velcro® fabrics, which are used to adhere a cushion material and a cover material, applied to a seat for vehicles, to each other, to the cushion material and the cover material.

Further, a seat padding material for vehicles manufactured according to one embodiment of the present invention is applied to a seat for vehicles, the seat for vehicles is manufactured by adhering a cover material formed of natural leather or artificial leather to a cushion material in the form of a sponge or a non-woven fabric having cushioning and buffering functions, and here, the seat padding material for vehicles corresponds to the cushion material.

Although this embodiment describes that the padding material corresponding to the cushion material of the seat for vehicles and the Velcro® fabric are adhered to each other using the hot melt tape for Velcro® without sewing, the present invention is not limited thereto and is also applicable to adhesion between the cover material of the seat for vehicles and the Velcro® fabric.

However, a method for adhering the padding material and the Velcro® fabric using the hot melt tape for Velcro® without sewing will be illustrated by way of example below.

The hot melt tape for Velcro® without sewing according to one embodiment of the present invention is a hot melt tape configured to adhere a Velcro® fabric to a padding material forming a seat for vehicles, and includes a release paper, and a hot melt resin layer formed on the surface of the release paper by coating.

Here, one of various kinds of release papers, which are applicable to an adhesive tape, may be applied as the release paper.

The hot melt resin layer is formed by coating the release paper with a reactive hot melt resin having a melting point of 40-80° C. before reacting, and the reactive hot melt resin includes 0.5-2 wt % of montmorillonite (MMT) and the balance of a base resin.

Particularly, the base resin of the reactive hot melt resin includes polyol acquired by reacting polycaprolactone (PCL) having a melting point of 50-70° C. and polyester polyol with each other.

Hereinafter, a method for manufacturing a seat padding material for vehicles using the above-configured hot melt tape for Velcro® without sewing will be described in detail.

FIG. 1 is a flowchart illustrating a method for manufacturing a seat padding material for vehicles according to one embodiment of the present invention.

As shown in FIG. 1, the method according to one embodiment of the present invention includes preparing materials, preparing a tape, adhering the tape, removing a release paper, adhering a Velcro® fabric, and executing hardening.

In the preparation of the materials, a padding material forming a seat for vehicles and the Velcro® fabric are prepared.

Here, a padding material in the form of a sponge or a non-woven fabric may be applied as the padding material. Further, in general, Velcro® fabrics include a fabric having hooks and a fabric having loops coupled to the hooks in order to adhere two articles to each other. In this embodiment, both of the fabric having hooks and the fabric having loops may be applied, and thus, hereinafter the two kinds of fabric will be together referred to as "Velcro®".

In the preparation of the tape, a hot melt resin layer is formed by coating the release paper with a reactive hot melt resin having a melting point of 40-80° C. before reacting.

Here, as the reactive hot melt resin, a reactive crystalline resin having a melting point of 40-80° C. before reacting and a high degree of crystallinity is prepared. Thereby, the padding material and the Velcro® fabric may be adhered at a relatively low temperature of 30-70° C.

The reactive crystalline resin may have viscosity greater than or equal to an appropriate level. Therefore, when the release paper is coated with the reactive crystalline resin, a desired amount of the reactive crystalline resin is applied to the surface of the release paper.

One of various resins having the above-described physical properties may be applied as the reactive crystalline resin. For example, in this embodiment, a resin including 0.5-2 wt % of montmorillonite (MMT) and the balance of a base resin may be used as the reactive crystalline resin.

Here, the base resin is a main material that enables the reactive crystalline resin to exhibit adhesive performance at a low temperature, and may include polyol acquired by reacting polycaprolactone (PCL) having a melting point of 50-70° C. and polyester polyol with each other.

Polycaprolactone (PCL) is a resin which is mixed with polyester polyol to synthesize polyether polyol for securing fluidity, and serves to lower the melting point of the reactive crystalline resin.

Polyester polyol is crystalline polyester derived from dicarboxylic acid and diol and/or derived from hydroxycarboxylic acid, and, for example, may be produced so as to have a molecular weight of 1,500-4,000 and a hydroxyl value of 25-55 mg KOH/g by simultaneously reacting a diol, such as poly(neopentyl adipate), selected from the group consisting of 2,2-dimethyl-1,3-propanediol, 1,4-butanediol, ethylene glycol, and 1,6-hexanediol, with dodecanedioic acid and isophthalic acid or adipic acid independently or simultaneously.

Therefore, polycaprolactone (PCL) and polyester polyol are mixed in appropriate amounts so that viscosity becomes equal to or greater than a designated level. For example, polyester polyol and polycaprolactone (PCL) are mixed at a content ratio of 1:0.8-1.5.

Further, the base resin may further include an appropriate amount of isocyanate for the purpose of reaction of the resin.

Further, when the surface of the release paper is coated with the hot melt resin, in order to use the reactive crystalline resin as an adhesive, the reactive crystalline resin is heated to 100° C. or higher, particularly 100-170° C., so as to be melted, and is then applied to the release paper.

The prepared hot melt tape is cut out to have an appropriate size and shape.

When the padding material, the Velcro® fabric and the hot melt tape are prepared, the hot melt tape is adhered to the prepared padding material in order to adhere the padding material and the Velcro® fabric using the hot melt tape.

In the adhesion of the tape, the hot melt tape is adhered to the surface of the padding material by disposing the hot melt tape on the prepared padding material and then applying heat of a temperature of 30-70° C., which is lower than the temperature corresponding to the melting point of the reactive crystalline resin by a designated temperature, and pressure thereto.

When the hot melt tape is adhered to the padding material in this way, the release paper is removed.

In the removal of the release paper, the release paper is peeled off from the hot melt tape adhered to the padding material, thus being removed.

When a hot melt resin layer is exposed by removing the release paper from the hot melt tape, the Velcro® fabric is adhered to the exposed hot melt resin layer.

In the adhesion of the Velcro® fabric, the Velcro® fabric is adhered to the padding material by the hot melt resin layer by adhering the Velcro® fabric to the hot melt resin layer, and, here, the Velcro® fabric is adhered to the hot melt resin layer by applying pressure in the state in which the hot melt resin layer is maintained at a temperature of 30-70° C. or is again heated to a temperature of 30-70° C.

When the Velcro® fabric is adhered to the padding material by the hot melt resin layer in this way, the hot melt resin layer is hardened.

In the execution of hardening of the hot melt resin layer, the reactive crystalline resin forming the hot melt resin layer is hardened in the state in which the Velcro® fabric is adhered to the padding material by the hot melt resin layer, thereby maintaining adhesion between the padding material and the Velcro® fabric. Here, in the execution of hardening of the hot melt resin layer, the reactive crystalline resin is cooled without reacting, and thus exhibits adhesive performance. For this purpose, the reactive crystalline resin is hardened by cooling the padding material and the Velcro® fabric adhered by the reactive crystalline resin to a temperature of 0-20° C., which is lower than the melting point of the reactive crystalline resin.

Further, in the execution of hardening of the hot melt resin layer, in order to more strongly maintain the adhesive strength between the padding material and the Velcro® fabric, the reactive crystalline resin may be induced to be secondarily hardened in the state in which the reactive crystalline resin is cooled so as to exhibit adhesive performance (i.e., in the state in which primary hardening of the reactive crystalline resin is completed).

In secondary hardening, among the reactive crystalline resin, rapid reaction of the resin in amorphous portions is induced so as to exhibit high peel strength. For this purpose, secondary hardening of the reactive crystalline resin is induced by maintaining the padding material and the Velcro® fabric, adhered by primarily hardening the reactive crystalline resin, in an atmosphere of a temperatures of 20-30° C. and a humidity of 50% or higher for at least 2 hours.

Peel strength between the padding material and the Velcro® fabric, having undergone primary hardening and secondary hardening, may be maintained at 5 M/mm or higher.

Hereinafter, the quality of the seat padding material for vehicles according to the present invention, manufactured by the above-described process, will be examined through various tests.

First, tests on peel strength between the padding material and the Velcro® fabric and damage to loop yarns depending on the heating temperature applied to the hot melt tape in the adhesion of the tape were conducted.

Here, respective specimens were prepared through the operations according to the present invention, i.e., by preparing materials, preparing a hot melt tape, adhering the hot melt tape, removing a release paper, adhering a Velcro® fabric, and executing hardening, and the conditions in the respective operations are the same as the above-described conditions according to the exemplary embodiment of the present invention. However, the heating temperature applied to the hot melt tape in the adhesion of the hot melt tape was variously changed, as set forth in Table 1 below, and the measured peel strength between the padding material and the Velcro® fabric and whether or not loop yarns are damaged depending on the temperature were observed, and the results thereof are shown in Table 1.

TABLE 1

| Heating Temp. | Peel strength (N/20 mm) | Damage to PET loop yarn | Appropriateness |
| --- | --- | --- | --- |
| 20-29° C. | 1.5 | No damage | Below reference peel strength value/inappropriate |
| 30-39° C. | 5 | No damage | Appropriate |
| 40-49° C. | 7 | No damage | Appropriate |
| 50-59° C. | 6.5 | No damage | Appropriate |
| 60-70° C. | 6.5 | Damage of 10% | Relatively appropriate |
| 71-75° C. | 7 | Damage | Inappropriate |

As state in Table 1, it may be confirmed that, when the heating temperature of the hot melt tape was in the range of 30-70° C., the peel strength between the padding material and the Velcro® fabric was maintained at 5 N/20 mm or higher.

However, it may be confirmed that, when the heating temperature of the hot melt tape was lower than 30° C., the loop yarns were not damaged but the peel strength between the padding material and the Velcro® fabric was relatively low.

Further, it may be confirmed that, when the heating temperature of the hot melt tape was higher than 70° C., the peel strength between the padding material and the Velcro® fabric was excellent but the loop yarns were partially or completely damaged.

Next, tests on peel strength and heat resistance depending on materials applied to the hot melt tape were conducted.

Here, respective specimens were prepared through the operations according to the present invention, i.e., by preparing materials, preparing a hot melt tape, adhering the hot melt tape, removing a release paper, adhering a Velcro® fabric, and executing hardening, and the conditions in the respective operations are the same as the above-described conditions according to the exemplary embodiment of the present invention. However, the adhesive material used in the preparation of the hot melt tape was variously varied, as set forth in Table 2 below, and the measured peel strength between the padding material and the Velcro® fabric and heat resistance were observed, and the results thereof are shown in Table 2.

TABLE 2

| Kind | Peel strength (N/20 mm) | Heat resistance (90° C.) | Appropriateness |
|---|---|---|---|
| Reactive polyurethane hot melt tape | 5 | No problem | Appropriate |
| Reactive polyurethane coating | 2 | No problem | Inappropriate |
| Low-melting point thermoplastic hot melt tape | 3 | Peeled | Inappropriate |
| High-melting point thermoplastic hot melt tape | 5 | No problem | Inappropriate |
| Adhesive tape | 1 | Partially peeled | Inappropriate |
| Adhesive bond | 1 | No problem | Inappropriate |

As set forth in Table 2, it may be confirmed that, when the reactive polyurethane hot melt tape (reactive hot melt resin) according to the present invention was used as the adhesive material, the peel strength between the padding material and the Velcro® fabric was maintained at 5 N/20 mm or higher, and there is no problem in terms of heat resistance.

However, it may be confirmed that, when a reactive polyurethane resin, a low-melting point thermoplastic hot melt resin, a high-melting point thermoplastic hot melt resin, an adhesive tape and an adhesive bond were used, the peel strength between the padding material and the Velcro® fabric was relatively low.

Further, it may be confirmed that, when the low-melting point thermoplastic hot melt resin and the adhesive tape were used, the Velcro® fabric was peeled off from the padding material at a temperature of 90° C.

As is apparent from the above description, a hot melt tape for Velcro® without sewing according to one embodiment of the present invention is formed of a reactive crystalline resin having a low melting point and a short hardening time and is used to adhere a Velcro® fabric to a cushion material or a cover material, thereby being capable of adhering the Velcro® fabric to the cushion material or the cover material at a low temperature and shortening a time taken to complete adhesion of the Velcro® fabric to the cushion material or the cover material.

Further, the hot melt tape for Velcro® without sewing according to one embodiment of the present invention realizes adhesion of the Velcro® fabric to the cushion material or the cover material and hardening thereof at low temperatures and may thus suppress damage to the cushion material or the cover materials, and does not cause any sewing lines and may thus prevent degradation of quality of an interior material.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing a seat padding material for vehicles, comprising:
   preparing a padding material for a seat for the vehicles and a hook-and-loop fabric;
   preparing a hot melt tape having a hot melt resin layer formed by coating a surface of a release paper with a reactive hot melt resin having a melting point of 40-80° C. before reacting;
   adhering the hot melt tape to a surface of the prepared padding material by disposing the hot melt tape on the padding material and then applying heat of a temperature of 30-70° C. and pressure thereto;
   removing the release paper from the hot melt tape adhered to the padding material;
   adhering the hook-and-loop fabric to the hot melt resin layer exposed by removing the release paper; and
   hardening the hot melt resin layer by cooling the padding material and the hook-and-loop fabric, adhered to each other by the hot melt resin layer, to a temperature of 0-20° C.

2. The method according to claim 1, wherein, in the preparing of the hot melt tape, the reactive hot melt resin comprises a base resin,
   wherein the base resin comprises polyol acquired by reacting polycaprolactone (PCL) having a melting point of 50-70° C. and polyester polyol with each other.

3. The method according to claim 2, wherein, in the preparing of the hot melt tape, the reactive hot melt resin comprises 0.5-2 wt % of montmorillonite (MMT) and a balance of the base resin.

4. The method according to claim 2, wherein, after the hardening of the hot melt resin layer, a peel strength of each of the padding material and the hook-and-loop fabric is 5 N/mm or higher.

* * * * *